Sept. 2, 1958 G. M. RAPATA 2,850,064
NUT STRUCTURE HAVING ELASTIC GRIPPING
ACTION AND SEALING MEANS
Filed Aug. 27, 1954
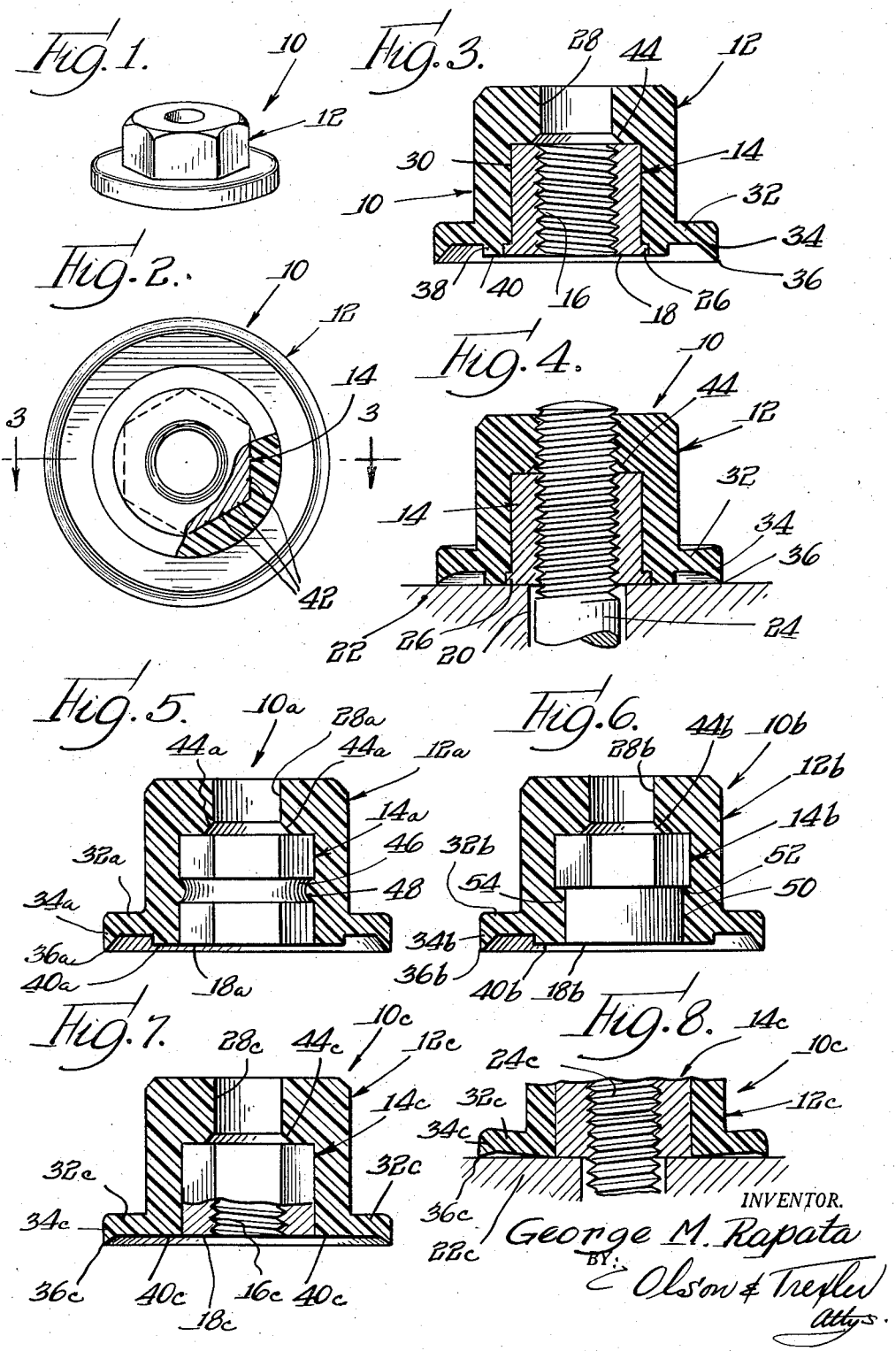
INVENTOR.
George M. Rapata
BY
Olson & Trexler
Attys.

United States Patent Office 2,850,064
Patented Sept. 2, 1958

2,850,064

NUT STRUCTURE HAVING ELASTIC GRIPPING ACTION AND SEALING MEANS

George M. Rapata, Chicago, Ill., assignor to Illinois Tool Works, Chicago, Ill., a corporation of Illinois Application August 27, 1954, Serial No. 452,477

1 Claim. (Cl. 151—7)

The present invention relates to a novel fastener device and more particularly, to a novel nut structure.

As will be understood, there are many applications for nut structures wherein it is desirable to seal the aperture in a workpiece through which a screw member or the like extends for cooperation with the nut structure against the passage of moisture, fumes, dirt and the like. It is also often desirable to provide a nut structure which is self-locking so as to eliminate the need for lock washers and the like. It is an object of the present invention to provide a novel nut structure which is not only self-sealing but is also self-locking.

Another object of the present invention is to provide a novel self-sealing and self-locking nut structure made from plastic and metallic materials in a manner so that the nut structure has great holding power.

A further object of the present invention is to provide a novel nut structure of the above described type which is of relatively simple construction and may be economically manufactured.

Still another object of the present invention is to provide a novel method for making a nut structure of the above described type in a rapid and economical manner.

Other objects and advantages of the present invention will become apparent from the following description and the accompanying drawings wherein:

Fig. 1 is a perspective view of a nut structure embodying the principles of this invention;

Fig. 2 is an enlarged bottom end view of the novel nut structure partially broken away to show the construction in greater detail;

Fig. 3 is a cross sectional view taken along line 3—3 in Fig. 2;

Fig. 4 is a cross sectional view similar to Fig. 3 but further showing the novel nut structure applied to a complementary screw member and a workpiece;

Fig. 5 is a cross sectional view similar to Fig. 3 but showing a slightly modified form of the present invention;

Fig. 6 is a cross sectional view showing another slightly modified form of the present invention;

Fig. 7 is a cross sectional view showing a further modified form of the present invention; and Fig. 8 is a fragmentary cross sectional view showing the nut structure of Fig. 7 applied to a complementary screw member and a workpiece.

Referring now more specifically to the drawings wherein like parts are designated by the same numerals throughout the various figures, a nut structure 10 embodying one form of the present invention is shown in Figs. 1 through 4. The nut structure 10 includes an outer cap or body member 12 formed from an impressionable material which is preferably a thermo-plastic material, and an inner metallic nut member 14. The nut member 14 has an internally threaded bore 16 and is preferably provided with a non-circular exterior shape. If desired, the nut member 14 may be provided with the usual hexagonal shape as shown in the drawings. The nut member 14 includes a workpiece engaging or clamping end surface 18 which should have a greater diameter than the diameter of aperture 20 in a workpiece 22 through which a complementary screw member 24 is adapted to extend for cooperation with the nut structure as shown in Fig. 4. The diameter and total area of the nut member clamping surface 18 may be materially increased without substantially increasing the amount of metal stock required by providing the nut member with a radially extending flange 26.

The plastic body member 12 is provided with an axially extending bore 28 which is in general alignment with the threaded bore of the nut member and has a diameter less than the maximum diameter of the threaded bore 16 of the nut member. In addition, plastic body member is provided with an enlarged recess 30 which is of substantially the same size and shape as the nut member which is disposed therein. In accordance with an important feature of the present invention, the plastic body member is provided adjacent its clamping end with a radially extending flange 32. The periphery of the flange 32 is formed with an annular beveled portion 34 extending axially outwardly from the clamping end surface of the nut structure and having a relatively sharp terminal edge 36 adapted to be drawn into sealing engagement with the workpiece. In order to prevent undue flexing of the flange 32 upon application to the workpiece, the plastic body member 12 is provided with an annular portion 38 confining the flange 26 of the nut member and having a clamping end surface 40 which is substantially in the same plane as the clamping surface 18 of the nut member.

Since the exterior surface of the nut member 14 and the enlarged recess 30 are non-circular in shape, it will be appreciated that the metallic nut member and plastic body member are locked against relative rotation. In accordance with the present invention, the nut member and the plastic body member are interlocked to prevent axial separation thereof in a simple manner. As will be understood by those familiar with the prior art, the exterior surface of the metallic nut member 14 has numerous interruptions therein in the form of scratches, nicks and the like, which interruptions are formed during shaping of the metallic stock into the nut member by utilizing known methods and apparatus. In accordance with the present invention, the metallic nut member and plastic body member are mechanically interlocked to prevent axial separation thereof by heating and flowing the plastic material adjacent the metallic nut member so that the plastic material flows into the interruptions in the surface of the nut member. The method of the present invention for assembling the nut structure 10 contemplates that the metallic nut member should be fully inserted into the plastic body member recess 30. Then the preliminary assembly is placed within a high-frequency heating apparatus for a short period of time and the plastic material adjacent the metallic nut member is flash-melted and caused to flow into the irregularities in the nut member surface as indicated at 42. Such high-frequency heating machines and their mode of operation are well known and, therefore, need not be shown or further described.

The nut structure 10 is adapted for use in an installation such as that shown in Fig. 4. More particularly, the nut structure is adapted to be tightened against or drawn against the surface of a workpiece 22 upon application of the nut structure to the complementary screw member 24. It should be noted that as the nut structure is threaded onto the screw member, the screw member passes through the bore 28 and impresses the complementary helical screw threads in the wall of the bore. In order to facilitate starting of the screw member through the bore 28, it should be noted that the plastic body member is provided with a conical internal wall section 44 so that the wall of the bore 28 is spaced axially from the inner end of the metallic nut member 14. Thus, during application of the nut structure to the screw member, initial complementary screw thread impressions may be relatively easily formed in the conical internal wall section 44. The plastic material from the body member 12 is inherently resilient so that after it has been impressed by the complementary screw member, the thread impressions in the wall of the bore 28 resiliently grip the screw member to not only seal the bore 28 but also to lock the nut structure and the screw member against inadvertent or unauthorized relative rotation. When the nut structure is drawn tightly against the surface of the workpiece as shown in Fig. 4, the sealing portion 34 of the flange 32 engages the surface of the workpiece and is deformed so that it fills any irregularities or depressions in the workpiece surface whereby to provide an effective seal against the entry of moisture, fumes, dirt or the like, between the nut structure and the workpiece surface.

Fig. 5 shows a nut structure 10a which is similar to the above described nut structure as indicated by the application of identical reference numerals with the suffix "a" added to corresponding elements. This embodiment differs in that the metallic nut member 14a is provided with an annular groove or inwardly extending shoulder means 46 into which an annular rib 48 of the plastic body member projects for positively interlocking the metallic nut member and the plastic body member. The rib 48 is formed after insertion of the nut member within the plastic body member by flash-melting and flowing the plastic material in the manner described above. With this structure a stronger and more positive interlocking is obtained between the metallic nut member and the plastic nut member so that any possibility of these members becoming axially separated is substantially eliminated.

Fig. 6 shows another modification of the present invention whereby a more positive interlocking is obtained between the metallic nut member and the plastic body member than in the embodiment of Figs. 1 through 4. In this embodiment which is essentially identical to the above described embodiments as indicated by the application of identical reference numerals with the suffix "b" added to corresponding elements, the metallic nut member 14b is provided with a reduced diameter portion 50 and a radial shoulder 52. The plastic material of the body member 12b is also flash-melted and flowed inwardly as indicated at 54 for interlocking engagement with the shoulder 52.

Figs. 7 and 8 show another slightly modified form of the present invention which is similar to the embodiment of Figs. 1 through 4 as indicated by the application of identical reference numerals with the suffix "c" added to corresponding elements. This embodiment differs in that the above described flange 26 of the metallic nut member has been omitted as is permissible for certain installations and the radially extending flange 32b is located at the extreme clamping end of the plastic body member. It will be appreciated that this modification simplifies the structure so as to facilitate more economical manufacturing while at the same time, the self-sealing and self-locking characteristics of the above described embodiments are obtained. In the embodiments of Figs. 6 and 7, the metallic nut member and the plastic nut member are retained against axial separation in the same manner as the corresponding members of the nut structure 10 described above.

From the above description, it is seen that the present invention has provided a novel nut structure which may be relatively easily and economically manufactured and which has effective self-sealing and self-locking characteristics. In addition, it is seen that the present invention has provided a novel method whereby the metallic nut member and the plastic body member of the nut structure may be assembled and locked together in rapid and economical manner.

While the preferred embodiments of the present invention have been shown and described herein, it is obvious that many structural details may be changed without departing from the spirit and scope of the appended claim.

The invention is claimed as follows:

A self sealing composite nut structure comprising a plastic body member having a preformed recess opening within a work engaging end surface adapted to provide a seal with a workpiece surface, and a metallic nut member disposed within said recess and including surface configurations interlocked with the plastic material of the body member, said nut member having one end portion exposed to provide a work engaging clamping surface substantially coplanar with the adjacent work engaging end surface of the plastic body member, radial flange means projecting outwardly from the plastic body member adjacent the work engaging end surface and terminating in a peripherally narrow circular sealing flange normally projecting below the said work engaging end surface to provide an outwardly spaced additional seal between the nut structure and the workpiece surface, said radial flange means having an internal annular recess between said work engaging end surface and said circular sealing flange and opening toward the workpiece surface, and said plastic body member including an annular portion overlying the opposite end of the nut member and terminating in a bore of a diameter such that the threads of a securing bolt passing through the nut member will bite into and threadedly engage the surface of the bore to provide an additional seal and interlock for the assembled structure, the said bore in the annular portion of the plastic body member terminating adjacent the nut member in a conical wall section spacing the end of the nut member from the adjacent end of the bore whereby to facilitate initial threaded engagement of the securing bolt with the plastic body member to minimize tendency to jack up the annular portion of the plastic body member overlying the nut member.

References Cited in the file of this patent

UNITED STATES PATENTS

| | | |
|---|---|---|
| 1,739,246 | Majce | Dec. 10, 1929 |
| 2,333,388 | Poupitch | Nov. 2, 1943 |
| 2,401,824 | Gladden et al. | June 11, 1946 |
| 2,417,262 | Morehouse | Mar. 11, 1947 |
| 2,425,104 | Luce | Aug. 5, 1947 |
| 2,485,769 | Phelps | Oct. 25, 1949 |
| 2,529,863 | Bowen | Nov. 14, 1950 |
| 2,706,656 | Roubal | Apr. 19, 1955 |